Patented Feb. 12, 1946

2,394,735

UNITED STATES PATENT OFFICE 2,394,735

CUTTING OIL

John S. Yule, Chicago, Ill., assignor to The Pure Oil Company, Chicago, Ill., a corporation of Ohio No Drawing. Application June 25, 1943,
Serial No. 492,319

11 Claims. (Cl. 252—46.6)

This invention relates to improvements in cutting oils.

An object of this invention is to provide an improved cutting oil.

Another object of the invention is to provide a method for preparing an improved cutting oil and an improved cutting oil base.

Other objects of the invention will appear from the description which follows.

In Whittier et al. application Serial No. 353,840, now Patent No. 2,352,818, there is disclosed a lubricant composition and method for preparing same involving sulfo-chlorination and phosphorization of fatty bodies. Compositions made in accordance with the aforesaid application materially improved the cutting oil properties of straight mineral oil.

I have discovered that superior cutting oils can be prepared by incorporating sulfo-chlorinated and phosphorized fatty bodies such as the composition made in accordance with the aforesaid application in sulfurized mineral oil.

In accordance with my invention a sulfurized mineral oil may be prepared by mixing with 9.61 parts by weight of #1 lard oil, 80.46 parts of Gulf Coast or Mid-Continent mineral lubricating oil having a viscosity of approximately 100 seconds Saybolt at 100° F., and 0.46 part by weight of sulfur chloride. The mixture is heated in a steam jacketed kettle to approximately 250° F. and 3.13 parts by weight of sulfur is thereupon added to the mixture. The entire mixture is stirred and cooked for a period of approximately 7 hours at a temperature of approximately 315° F. 6.2 parts by weight of kerosene and .1 part by weight of pine oil is then added to the mixture and the entire mixture is blown for 30 minutes. The resulting product will have a viscosity at 100° F. of 115 to 130 seconds Saybolt, a sulfur content of slightly more than 3% and an odor corresponding to pine oil.

In preparing the sulfurized mineral oil base the proportions of fatty oil may be varied somewhat from those given in the preceding example or it may be omitted, but in any case the mineral oil should form by far the predominant portion of the mixture. The amount of sulfur used may also vary, but in no case should it be in excess of the amount which will remain in solution or combination without precipitating out upon sudden chilling of the resulting composition, after dilution with an equal volume of naphtha, to 0° F. or lower, nor should the sulfur be below approximately 3% by weight. Use of sulfur chloride is not indispensable but its presence accelerates the reaction. The fatty oil is useful in aiding to stabilize the composition so that sulfur does not precipitate out. The kerosene is used merely to obtain the desired viscosity of the final product and the pine oil is used to obtain a good odor. Although the cooking temperature may be varied within the range of approximately 300 to 400° F. at atmospheric pressure, higher temperatures may be used if the cooking is conducted under superatmospheric pressure in an oxygen-free atmosphere. I have found that by cooking the composition for approximately seven hours at 315° F. a product of the desired stability and sulfur content is obtained and the sulfur is present in the composition in the desired corrosive condition. The air blowing step eliminates free hydrogen sulfide.

In order to determine whether the finished product is sufficiently stable, the sample is diluted with an equal volume of naphtha and quickly chilled to 0° F. or below. If no sulfur crystallizes in 24 hours the product is satisfactory. In the table which follows the product made as above described is referred to as S–3.

The sulfo-chlorinated and phosphorized fatty base may be made in accordance with the description in application, Serial No. 310,683, or in accordance with Patent No. 2,268,232. As a specific example of a sulfo-chlorinated and phosphorized base made in accordance with the aforesaid application, 83.02% by weight of #1 lard oil was mixed with 5.66% Gulf Coast neutral oil having a viscosity of 200 seconds Saybolt at 100° F. and a total of 11.32% by weight of sulfur monochloride was added to this mixture with constant stirring at such a rate that the exothermic heat of reaction maintained the temperature of the mixture at about 145° to 155° F. After addition of the sulfur monochloride was completed, external heat was applied and the temperature increased to 275° to 285° F. This required a period of approximately one and one-half hours. The reaction mixture was held at 275° to 285° F. for three hours at the end of which time a polished copper strip immersed for three minutes showed no black deposits. The mixture was cooled to 220° to 230° F. and 0.4% by weight of phosphorus sesquisulfide added, the agitation being continued. This mixture was held at 220° to 230° F. for five hours using constant agitation. At the end of this time the lubricant base was cooled. The product had a sulfur content of 5.26%, a chlorine content of 5.34% and a phosphorus content of 0.21% by weight. The product made in accordance with this procedure will be hereinafter designated as S-30 base.

Although sulfo-chlorinated and phosphorized fatty bodies of different sulfur, chlorine and phosphorus content may be used, I prefer lard oil containing combined therewith approximately 5% of sulfur, 5% of chlorine and approximately 0.2% of phosphorus by weight.

The finished cutting oil is preferably prepared by blending with the product designated as S-3 a small proportion of the product designated as S-30 base. Although the proportions of S-3 and S-30 base may vary over a wide range, I prefer to add not less than 5% nor more than 50% of S-30 base to S-3.

In order to test the effectiveness of a cutting oil made in accordance with my invention, the following oils were tested on a lathe while cutting S. A. E. 1045 steel:

(1) 10 parts S-30 base—90 parts S-3
(2) 10 parts S-30 base—90 parts mineral oil
(3) S-3
(4) Mineral oil Two types of cut were made. One type is described as a "medium cut" in which the depth of cut is .050 inch and the feed is .0094 inch per revolution. The second type is described as a roughing or "heavy cut" in which the depth of cut is .075 inch and the feed is .020 inch per revolution. The results are tabulated in the following table:

Table

| Material tested | Medium cut tool life | Medium cut finish life after 300 minutes | Heavy cut tool life |
| --- | --- | --- | --- |
| Mineral oil | 11.2 | 11.5 | 20 |
| S-3 | 8.0 | 11.0 | 37.0 |
| 10% S-30 base+90% mineral oil (by wt.) | 25.0 | 30.0 | 32.0 |
| 10% S-30 base+90% S-3 (by wt.) | 30.0 | 35.0 | 52.0 |

The mineral oil used in the test was a Mid-Continent neutral having the following characteristics:

A. P. I. gravity _____ 26.5 to 28.5
Pour, °F _____ +25
Flash, °F _____ 355 to 375
Fire, °F _____ 405 to 425
Viscosity at 100 _____ 100 to 110
Viscosity at 130 _____ 65 to 67.5
Color _____ 1.5
Carbon residue _____ 0.3

"Medium cut tool life" is the percentage increase in cutting speed obtained as compared with dry cutting, at a 300 minute tool life. The medium cut test is designed to evaluate the lubricating properties of the cutting oil in the cutting operation.

"Medium cut finish life" is the percentage increase in cutting speed for each cutting oil, as compared to dry cutting, at a finish life of 300 minutes. "Finish life" is the length of time during which a tool will cut at any given speed without a material change in surface finish of the work being cut.

Since surface roughness indicates the point on the work object where finish life has occurred, a device capable of measuring change in surface roughness is used to indicate finish life. This device consists of a pickup device having a sapphire needle connected to a piezo-electric crystal. The needle is set on the work object which has been cut and the object is rotated in a lathe. The vibrations of the needle induce an E. M. F. in the crystal which is directly proportional to the deflection of the crystal by the needle as it passes over the work. The E. M. F. is amplified and indicated on a meter calibrated so that the readings on the meter will be directly proportional to the roughness of the work surface. The point where a sudden change in E. M. F. occurs is the "finish life" of the tool.

"Heavy cut tool life" is the same as "medium cut tool life" except that in the former the test is performed while making a heavy instead of a medium cut on the work object. The heavy cut test is designed to evaluate the anti-weld properties of the cutting fluid.

From the results in the table it will be seen that although the "medium cut tool life" for S-3 is poorer than for mineral oil, when S-3 is blended with S-30 base, it increases the "medium cut tool life" more than does an equal proportion of mineral oil. The same improvement is obtained for "medium cut finish life" and "heavy cut tool life." Although S-3 is 17% better than straight mineral oil when blended with S-30 base, it improved the "heavy cut tool life" of the blend over that of S-30 base with mineral oil by 20%.

The testing method used for obtaining tool life or finish life is as follows:

A bar of metal 8" in diameter and two feet long is held between centers in an ordinary engine lathe. The engine lathe is driven by an infinitely variable speed motor which permits very close adjustments of surface cutting speed. A dry cut is first run, then an oil cut, and then another dry cut. A cutting speed is selected which will give a tool life of approximately five minutes. A new tool, ground to the same carefully controlled physical specifications, is used for each test. The time at which the tool fails is then noted and is plotted on log log paper using time and speed as coordinates. The cutting speed is then increased to allow another point to be determined in exactly the same manner as outlined above. At least four points are determined in this manner at different cutting speeds and a line is drawn through the points. Since the points are on a straight line, it is possible to accurately obtain from the curve, the cutting speed for any desired tool life. A 300 minute tool life is used as the basis for comparing the performance of cutting oils against a corresponding dry cut.

Thus, by blending together of sulfo-chlorinated and phosphorized fatty bodies with a sulfurized mineral oil containing corrosive sulfur in a stable condition, I have been able to obtain a cutting oil with cutting properties which are superior to those which could be anticipated from the characteristics of each product.

I claim:

1. The method of preparing cutting oil stock which comprises cooking a mixture of a small amount of fatty oil and sulfur chloride with a mineral lubricating oil, heating the mixture to a temperature slightly above the melting point of sulfur, adding sufficient sulfur to give a product having a sulfur content of approximately 3% and cooking the mixture at a temperature of approximately 300 to 350° F. until no sulfur crystallizes out when the mixture is diluted with an equal part of naphtha and suddenly chilled to 0° F. or lower.

2. The method in accordance with claim 1 in which the fatty oil is lard oil and the mineral lubricating oil is a Gulf Coast or Mid-Continent neutral having a viscosity at 100° F. of approximately 100 seconds Saybolt.

3. The method in accordance with claim 1 in which sufficient kerosene is added to the cooked mixture to reduce its viscosity to approximately 115 to 130 seconds Saybolt at 100° F. and the product is air blown for a sufficient length of time to eliminate substantially all hydrogen sulfide present.

4. The method of preparing cutting oil which comprises preparing a cutting oil stock in accordance with claim 1 and adding thereto a minor portion of sulfo-chlorinated and phosphorized fatty oil.

5. The method of preparing cutting oil which comprises preparing a cutting oil stock in accordance with claim 1 and adding thereto approximately 11 parts by weight of sulfo-chlorinated and phosphorized lard oil containing approximately 5% of sulfur, 5% of chlorine and 0.2% of phosphorus by weight.

6. The method of preparing a cutting oil comprising mixing together approximately 9.61 parts of lard oil, 80.46 parts of mineral oil and 0.46 part of sulfur chloride by weight, heating the mixture to approximately 250° F., adding to the heated mixture approximately 3.13 parts by weight of sulfur, heating the mixture at approximately 315° F. for approximately 7 hours, diluting the mixture with kerosene to a viscosity of 115 to 130 seconds Saybolt at 100° F., air blowing the mixture until free of hydrogen sulfide and blending approximately 90 parts by weight of the mixture with approximately 10 parts by weight of sulfo-chlorinated and phosphorized lard oil.

7. A cutting oil comprising approximately 10% by weight of sulfo-chlorinated and phosphorized lard oil in which the sulfur and phosphorus are present in non-corrosive condition and approximately 80 to 90% by weight of a composition prepared by cooking a mixture of a small amount of fatty oil and sulfur chloride with a mineral lubricating oil, heating the mixture to a temperature slightly above the melting point of sulfur, adding sufficient sulfur to give a product having a sulfur content of approximately 3% and cooking the mixture at a temperature of approximately 300 to 350° F. until no sulfur crystallizes out when the mixture is diluted with an equal part of naphtha and suddenly chilled to 0° F. or lower.

8. A cutting oil comprising a composition prepared by cooking a mixture of a small amount of fatty oil and sulfur chloride with a mineral lubricating oil, heating the mixture to a temperature slightly above the melting point of sulfur, adding sufficient sulfur to give a product having a sulfur content of approximately 3% and cooking the mixture at a temperature of approximately 300 to 350° F. until no sulfur crystallizes out when the mixture is diluted with an equal part of naphtha and suddenly chilled to 0° F. or lower, and sufficient sulfo-chlorinated and phosphorized fatty body, in an amount between 5 and 50% by weight of said composition to improve the cutting properties of said composition.

9. A cutting oil comprising chiefly a composition prepared by cooking a mixture of a small amount of fatty oil and sulfur chloride with a mineral lubricating oil, heating the mixture to a temperature slightly above the melting point of sulfur, adding sufficient sulfur to give a product having a sulfur content of approximately 3% and cooking the mixture at a temperature of approximately 300 to 350° F. until no sulfur crystallizes out when the mixture is diluted with an equal part of naphtha and suddenly chilled to 0° F. or lower, and sufficient sulfo-chlorinated and phosphorized fatty body, containing approximately 5% by weight of sulfur, 5% by weight of chlorine and 0.2% by weight of phosphorus chemically combined in the non-corrosive state, in an amount, between 5 and 50% by weight, to improve the cutting properties of said composition.

10. A cutting oil in accordance with claim 7 in which the sulfo-chlorinated and phosphorized lard oil contains approximately 5% of sulfur, 5% of chlorine and 0.2% of phosphorus by weight and the composition contains approximately 3% by weight of sulfur.

11. Cutting oil in accordance with claim 8 in which the fatty body is lard oil.

JOHN S. YULE.